US012549596B1

(12) United States Patent
Ben Haim et al.

(10) Patent No.: US 12,549,596 B1
(45) Date of Patent: Feb. 10, 2026

(54) ADDRESS DECODE AND TRANSLATE (ADT) LOGIC

(71) Applicant: Amazon Technologies, Inc., Seattle, WA (US)

(72) Inventors: Roi Ben Haim, Netanya (IL); Anna Rom-Saksonov, Rosh Haayin (IL); Jonathan Cohen, Hod Hasharon (IL); Guy Nakibly, Kedumim (IL); Sofya Zubtsovsky, Haifa (IL); Sebastian Mitelberg, Tzur Yigal (IL)

(73) Assignee: Amazon Technologies, Inc., Seattle, WA (US)

( * ) Notice: Subject to any disclaimer, the term of this patent is extended or adjusted under 35 U.S.C. 154(b) by 544 days.

(21) Appl. No.: 17/805,669

(22) Filed: Jun. 6, 2022

(51) Int. Cl.
*H04L 9/40* (2022.01)

(52) U.S. Cl.
CPC .................................. *H04L 63/1458* (2013.01)

(58) Field of Classification Search
CPC ..................................................... H04L 63/1458
See application file for complete search history.

(56) References Cited

U.S. PATENT DOCUMENTS

| | | | | |
|---|---|---|---|---|
| 10,855,578 B1* | 12/2020 | Mosko | ..................... | H04L 45/16 |
| 2019/0227741 A1* | 7/2019 | Carlough | ................ | G06F 3/068 |
| 2020/0320017 A1* | 10/2020 | Lakshman | ............ | G06F 13/385 |
| 2020/0351244 A1* | 11/2020 | Moore | ..................... | H04L 63/20 |
| 2020/0351334 A1* | 11/2020 | Bisht | ................... | H04L 41/0895 |
| 2021/0160275 A1* | 5/2021 | Anderson | ........... | H04L 63/1458 |
| 2021/0377294 A1* | 12/2021 | Gupta | ................... | H04L 67/562 |
| 2022/0179797 A1* | 6/2022 | Swanson | ............. | G06F 12/0888 |
| 2023/0063676 A1* | 3/2023 | Lahav | ....................... | G06F 9/52 |
| 2023/0086222 A1* | 3/2023 | Enamandram | ........ | G06F 13/409 710/313 |
| 2023/0153197 A1* | 5/2023 | Kaushik | ............... | G11C 29/024 714/768 |
| 2023/0308470 A1* | 9/2023 | Kulshreshtha | .......... | H04L 63/20 |

* cited by examiner

*Primary Examiner* — Taghi T Arani
*Assistant Examiner* — Blake I Narramore
(74) *Attorney, Agent, or Firm* — Weaver Austin Villeneuve & Sampson LLP

(57) ABSTRACT

An address decode and translate (ADT) circuit includes an address decode circuit configured to receive and decode transactions issued by a plurality of source nodes, and a resolution circuit configured to make certain resolutions and decisions based on results of decoding the transactions. For example, the resolution circuit can determine, among a plurality of target nodes of an adapter device, respective target nodes for performing the transactions, and translate transaction addresses of the transactions to local addresses of the adapter device. The resolution circuit is also configured to perform, for example, enabling monitoring of the execution of the transactions, detecting a denial-of-service (DOS) attack by the transactions, reordering the transactions, determining data caching attributes for the transactions, or a combination.

20 Claims, 10 Drawing Sheets

ND TRANSLATE (ADT)
ADDRESS DECODE AND TRANSLATE (ADT) LOGIC

BACKGROUND

A computing service system, such as a cloud computing service system, may include a plurality of servers that can host data and applications. The computing service system may be used by many clients or organizations to run instances, such as virtual machine instances or bare-metal instances (e.g., running guest operating systems directly on the server hardware). A multi-tenant computing service system may be used by multiple clients at the same time, where instances can be allocated to a client when the client needs them, and can be decommissioned when the instances are no longer needed such that the resources can be reallocated to other clients. In some computing service systems, the hardware functions of a server may be offloaded to one or more adapter cards, system-on-chips (SOCs), or other circuits that are connected to the host of the server through, for example, Peripheral Component Interconnect express (PCIe) interface, Advanced extensible Interface (AXI), or other interfaces.

BRIEF DESCRIPTION OF THE DRAWINGS

Various embodiments in accordance with the present disclosure will be described with reference to the drawings, in which.

DETAILED DESCRIPTION

Figure 1:
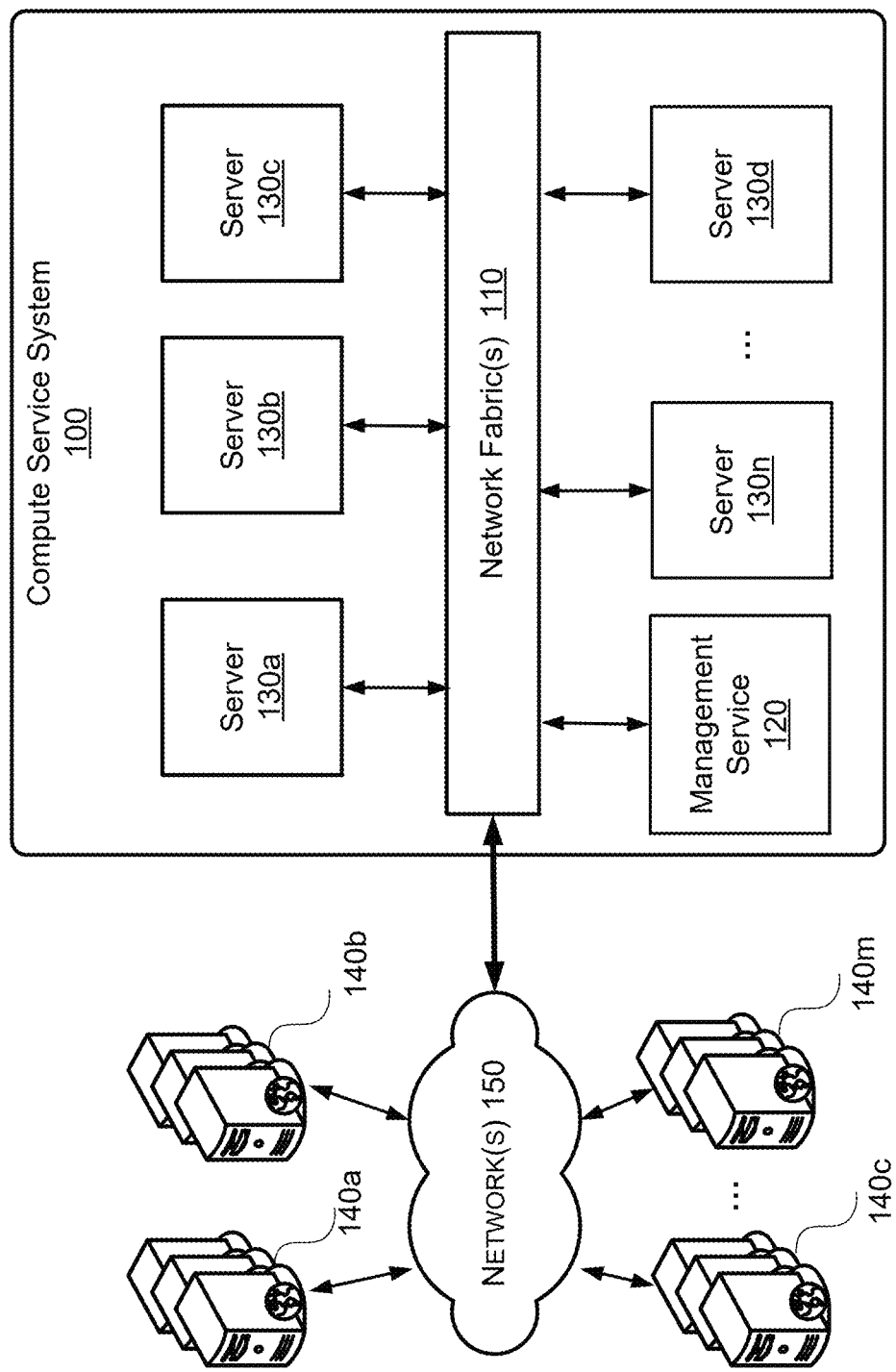
FIG. 1 illustrates an example of a computing service system in a web-based service environment according to certain embodiments.

A computing service system may include a plurality of servers that can run client workloads, such as application hosting, machine learning, web storage, database, or virtual servers. Generally, clients may request services from the computing service system (e.g., via a management entity), and the management entity may respond by provisioning a virtual server or a virtual machine (VM) on a server, and making the virtual server or virtual machine available to the client. Different clients may have different types of workloads, which may generally use hardware having different functions or configurations. For example, one type of workloads may use a unique combination of CPU, memory, storage, and network capacity. In order to provision different types of workloads for different clients, servers with different hardware and software configurations may be needed.

In some computing service systems, the hardware functions may be offloaded to one or more adapter cards, system-on-chips (SOCs), or circuits that are connected to the host of the server through, for example, Peripheral Component Interconnect express (PCIe) interface, advanced extensible interface (AXI), or other interfaces. The adapter cards may include, for example, network cards, storage cards, cryptographic cards, direct memory access (DMA) cards, and the like. In some implementations, an adapter card or SOC may support more than one server. In some implementations, multiple adapter cards or SOCs may support one server. An adapter card or SOC may include multiple target nodes that may be able to perform different functions, such as processors (e.g., accelerator engines, cryptographic engines, graphics processing units (GPUs), or audio processors), memory (e.g., SRAMs, DRAMs, NVM, or register files), DMA controllers, and input/output (I/O) devices, such as I/O controllers, PCIe devices, network controllers, Serial Advanced Technology Attachment (SATA) devices, AXI devices, flash memory devices, universal asynchronous receiver-transmitters (UARTs), universal serial bus (USB) devices, universal synchronous and asynchronous receiver-transmitters (USARTs), and the like.

Some of these adapter cards or SOCs may be virtualized and shared by multiple clients or multiple virtual machines at the same time. For example, in the virtualized environment, an adapter card or SOC may include multiple virtual functions (e.g., including lightweight PCI resources) assigned to virtual machines, and a physical function (e.g., a fully implemented PCI device) that manages the virtual functions, such that each virtual machine may view the adapter card as a resource dedicated to the virtual machine. To perform certain transactions, the virtual machines may generate task descriptors that specify the transactions to be performed by the virtual functions of the adapter card. When an adapter card in a virtualized environment receives (e.g., via the PCIe interface) one or more transactions (e.g., in the form of task descriptors) from one or more VMs, directly or through the host, the transactions may need to be decoded to determine the target nodes (or physical functions) and the virtual functions of the adapter card for performing the transactions, and then the transactions may be assigned to virtual queues of the virtual functions of the target nodes for execution.

According to certain embodiments, the adapter card, SOC, or another integrated circuit coupled to the adapter card or SOC may include an address decode and translate (ADT) circuit that can decode an incoming transaction to determine, for example, the physical function, the virtual function, and the virtual queue of the virtual function for the transaction. The ADT circuit may also map the transaction address from the host system address space that the host is aware of to the local physical address space (e.g., local DRAM address space) of the adapter card or SOC, such that the adapter card or SOC may perform the transaction using the local physical address that the adapter card or SOC is aware of.

In addition, based on the logic and physical information determined by the transaction decoding (e.g., the decoded physical functions, virtual functions, and/or virtual queues), the ADT circuit may make certain resolutions and decisions, such as selecting the target nodes for the transactions, associating the transactions with different ordering groups or removing dependencies between certain transactions, determining whether to track transactions associated with one or more virtual functions/virtual queues, detecting potential denial-of-service (DOS) attacks or other abnormal usage of the resources, and/or determining whether certain transactions needs to be cached.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example of a computing service system 100 in a web-based service environment according to certain embodiments. In the illustrated web-based service environment, one or more clients may utilize client devices 140a-140m (collectively, client devices 140) to access computing service system 100 via one or more networks 150. For example, client devices 140 may access computing service system 100 using a web browser, a command line interface, or a web service Application Program Interface (API). Client devices 140 may include any appropriate device operable to send and receive requests, messages, or other information over an appropriate network 150 and convey information back to a user of the device. The device may include, for example but not limited to, a mobile phone, a smart phone, a Personal Digital Assistant (PDA), a laptop computer, a desktop computer, a thin-client device, a tablet, an electronic book (e-book) reader, and the like.

In some examples, networks 150 may include any one or a combination of many different types of networks, such as cable networks, the Internet, wireless networks, cellular networks, and other private and/or public networks. Communications over the networks may be enabled by wired or wireless connections and combinations thereof. Networks 150 may support communications using any of a variety of commercially-available protocols, such as Transmission Control Protocol/Internet Protocol (TCP/IP), Open System Interconnection (OSI), File Transfer Protocol (FTP), Universal Plug and Play (UPnP), Network File System (NFS), or Common Internet File System (CIFS).

Computing service system 100 may include a management service 120 and a plurality of servers 130a, 130b, 130c, 130d, . . . , and 130n (collectively, servers 130) in a distributed computing environment. Management service 120 and servers 130 may be communicatively coupled to one or more network fabrics 110, which may be connected to networks 150 through, for example, high speed network connection, such as InfiniBand, Data Center Ethernet (DCE), gigabit Ethernet, fiber channel, Fiber Channel over Ethernet (FCOE), and the like. Network fabrics 110 may be any appropriate network, including an intranet, the Internet, a cellular network, a local area network, or any combination thereof. Network fabrics 110 may support communications using any of a variety of high speed communication protocols.

Servers 130 may include one or more servers, arranged in a cluster as a server farm, or as individual servers not associated with one another. These servers may be configured to host instances. In some implementations, each server of servers 130 may have identical or similar hardware resources. In some implementations, servers 130 may include a plurality of different types of servers that may have different hardware/software resources and/or configurations. A server may include an operating system that provides executable instructions for the general administration and operation of that server, and may include a computer-readable storage medium (e.g., a hard disk, random access memory, read only memory, etc.) storing instructions that, when executed by a processor of the server, allow the server to perform its intended functions. The operating system may be any of a variety of commercially-available operating systems or customer operating systems. Clients may run various applications on the operating system.

Management service 120 may be a server or platform that is configured to manage a pool of heterogeneous resources (e.g., servers or specialized hardware resources), provide access to clients and end users, monitor security, and manage resource allocation. Management service 120 may also include a user interface that can be used by a system administrator to control management service 120. For example, management service 120 may receive requests from client devices 140 or the system administrator and select one or more servers 130 to provision the requested instance(s) based on the specific request from the client or the system administrator. In some cases, management service 120 may allocate a predetermined number of resources to a client who may pay a flat fee or a monthly fee. In some cases, for a client that is charged on a pay-per-use basis, management service 120 may allocate resources to the client when the client needs them and decommission them when they are no longer needed, such that the resources can be allocated to other clients. Management service 120 may include a network interface for communication with network fabrics 110, a database for storing configurations and status of servers 130 connected to network fabrics 110, and a processing logic for selecting one or more available servers for an instance and performing other management functions.

Client devices 140 may request different types of instances (e.g., virtual machines or virtual servers) from computing service system 100. For example, in some cases, a client may request an instance that includes one or more GPUs. In some cases, a client may request an instance to perform high-performance computing for complex computational workloads, such as machine learning, batch processing, distributed analytics, high performance scientific or engineering applications, gaming, or video-encoding. In such cases, a server with multiple (e.g., tens of or hundreds of) high-performance processors and large memory may be needed.

In some cases, a client may request an instance with hardware optimized for high speed, low latency, random I/O access to data, for example, to run very high performance Not-only (non-relational) Structured Query Language (NoSQL) databases (e.g., Apache Cassandra® and MongoDB), transactional databases, data warehousing, Apache Hadoop®, or cluster file systems. In such cases, servers with high input/output (I/O) performance storage supported by, for example, solid-state drive (SSD) technology, may be used. In some cases, a client may request an instance with high-speed network communication capabilities for applications sensitive to network performance. In such cases, a server with a high-speed network link may be needed.

In some cases, a client may request an instance with high storage density and high speed sequential I/Os for data-intensive applications such as Massively Parallel Processing (MPP) data warehouse, Apache MapReduce and Hadoop® distributed computing, or log and data processing.

In some cases, a client may request an instance with access to a large volatile memory space. In such cases, a server with access to a large volatile memory, such as dynamic random access memory (DRAM), with a low latency may be needed. In some cases, a client may request an instance with access to a large non-volatile memory space. In such cases, a server with access to high-capacity non-volatile memory devices, such as SSDs or hard disks, may be needed. As used herein, volatile memory may refer to a type of data storage device whose contents may be lost when the power to the data storage device is turned off or interrupted, such as random access memory (RAM), while non-volatile memory may refer to a type of data storage device whose contents can persist even without power, such as read-only memory (ROM) or flash memory.

In some cases, a client may request an instance that includes a high performance computing (HPC) cluster, a GPU cluster, or a memory cluster, where the servers in the cluster are tightly coupled through node-to-node communication to achieve low-latency and high throughput network performance required by customer applications that need to perform network-intensive operations.

In some cases, a client may request a specific system hardware configuration. For example, the client may specify the number of processor cores, the size of the memory, the size of the storage device (e.g., SSD), and/or the operating system or Virtual Machine Monitor (VMM, e.g., hypervisor) needed for the applications. In some cases, the client may select a type of instance from multiple types of instances offered by the computing service system. For example, a computing service provider may offer different types or families of instances based on compute, memory, and storage capabilities, where different types of instances may provide different capabilities on computing performance, I/O performance, memory size and performance, storage size and performance, network performance, and graphic processing performance. In some cases, the client may request a particular operating system or hypervisor for the applications, such as Microsoft Windows®, Linux, Microsoft Hyper-V®, Citrix Xen®, VMware vSphere®, or open-source Kernel-based Virtual Machine (KVM). In some cases, the client may request a specific type of hardware, such as GPUs or SSDs.

Based on the specific requirement of the requested instance from a client, management service 120 may select one or more servers for the client. In implementations where all servers have same or similar hardware resources, management service 120 may randomly select any available server, or a cluster of available servers that are closely located for low-latency networking. In implementations where the servers may have different hardware resources, management service 120 may select a server that best matches the requirement of the client-requested instance with minimum extra resources.

Figure 2:
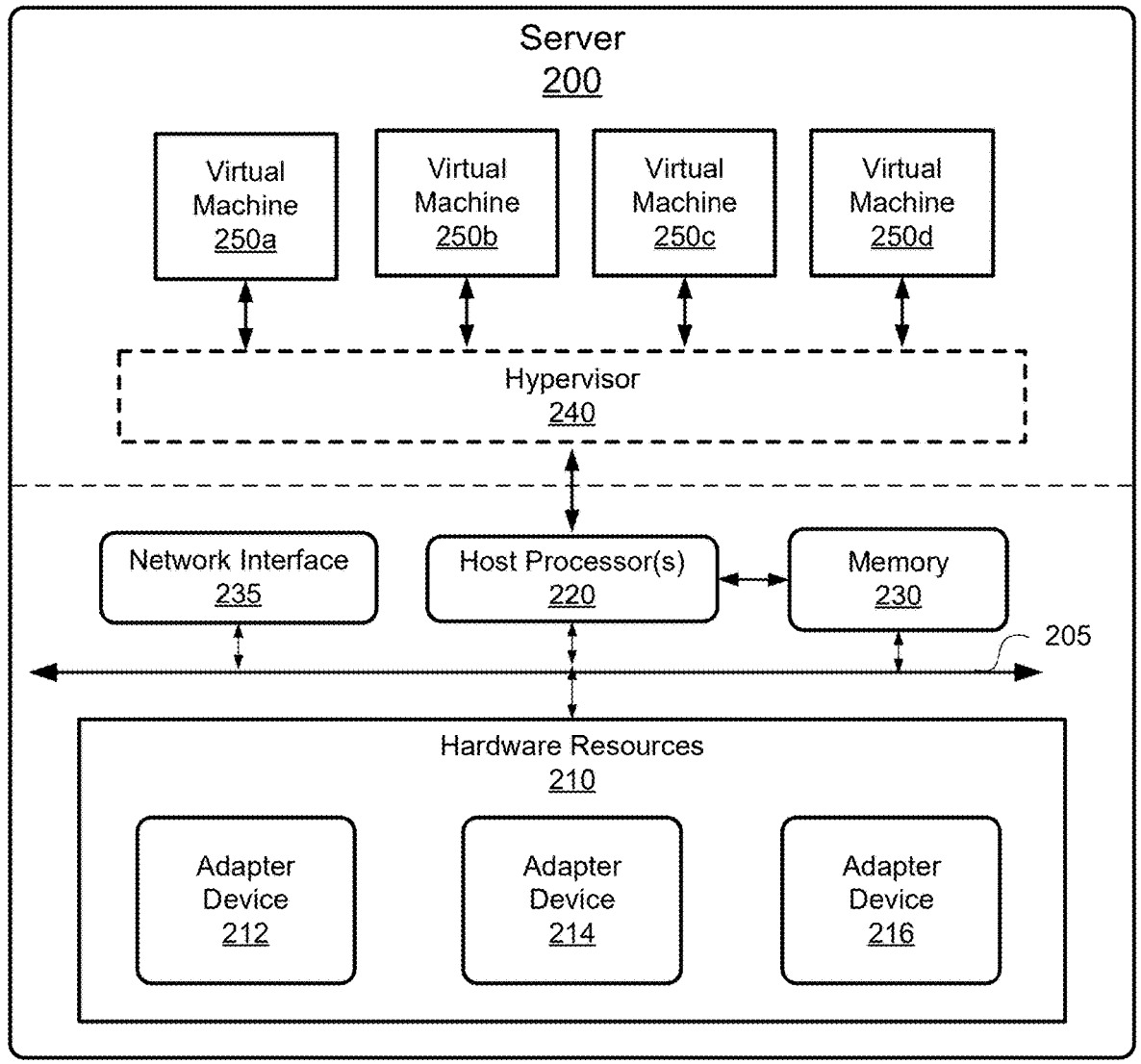
FIG. 2 illustrates an example of a server in a computing service system according to certain embodiments.

FIG. 2 is a simplified block diagram of an example of a server 200 in a computing service system according to certain embodiments. Server 200 may be an example of a server 130. Some components or modules of server 200 may be omitted in FIG. 2. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, some illustrative components of server 200 may be logical in nature such that the physical implementation of one or more components can be varied or such that one or more of the logical components may be implemented in a virtualized manner. Additionally, one or more servers 200 may share one or more of the illustrated or unillustrated components, such as processors, graphical processing units, memory, storage, and the like.

Server 200 may be associated with various hardware components, software components, and respective configurations that facilitate the execution of client applications. In some implementations, server 200 may provide a multi-tenant platform to multiple clients through multiple adapter devices. In some embodiments, server 200 may be dedicated to a client at a given time, while no other client may have access to server 200 at the same time.

In the example illustrated in FIG. 2, server 200 may include hardware resources 210, which may include one or more adapter devices, such as adapter devices 212, 214, and 216. Communications between the adapter devices and other components of server 200 may be performed using one or more communication channels 205, which may use interfaces such as Peripheral Component Interconnect (PCI) interfaces, PCI Express (PCIe) interfaces, PCI Extended (PCI-X) interfaces, or any other suitable interfaces. Communication channels 205 may include one or more buses, meshes, matrices, fabrics, a combination of these communication channels, or some other suitable communication channels. For example, communication channel 205 may correspond to a shared bus (e.g., a front side bus, a memory bus), a point-to-point bus such as a PCI or PCIe bus, and the like.

Server 200 may be, for example, an x86 server. Server 200 may include one or more host processors 220, which may include, for example, one or more x86 processor cores, or other circuits capable of executing machine-readable instructions. In some embodiments, host processor(s) 220 may include GPUs. Host processor(s) 220 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in host processor(s) 220 may include processors developed by ARM®, MIPS®, AMD®, Intel®, Qualcomm®, and the like. In certain implementations, host processor(s) 220 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, busses, level 1 (L1) caches, and/or level 2 (L2) caches. The instructions executed by host processor(s) 220 may be stored on a computer-readable storage medium, for example, in the form of a computer program. In some implementations, server 200 may include a baseboard management controller (BMC) (not shown in FIG. 2) for managing the operation of server 200 in accordance with, for example, the Intelligent Platform Management Interface (IPMI) standard.

Server 200 may also include a memory device 230, which may be volatile or non-volatile, and may store non-transitory executable code (e.g., firmware), which can be executed by host processor(s) 220 to cause components of server 200 to initialize and identify system devices such as the video display card, keyboard and mouse, hard disk drive, optical disc drive, and other hardware. Memory device 230 may also include firmware for, other components, such as the BMC and embedded controllers. Memory device 230 may include, for example, a random access memory (RAM), dynamic random access memory (DRAM), or a synchronous dynamic random-access memory (SDRAM), such as double data rate (DDR), DDR2, DDR3, or DDR4 SDRAM. In some embodiments, the memory module may include several levels of cache hierarchy, such as Level 1 (L1) caches, Level 2 (L2) caches, Level 3 (L3), or last level caches.

Server 200 may also include a network interface 235 that may include hardware and/or software configured to implement a protocol for communicating with externally connected devices or functions. For example, network interface 235 may include hardware and/or software for communicating with a network. Network interface 235 may include, for example, physical connectors or physical network ports for wired connection to a network, and/or antennas for wireless communication to a network. Network interface 235 may further include hardware and/or software configured to implement a network protocol stack. Network interface 235 may communicate with a network using a network protocol, such as, for example, TCP/IP, InfiniBand, Remote Direct Memory Access (RDMA) over Converged Ethernet (ROCE), Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others.

Adapter device 212, 214, or 216 may include, for example, a processing logic (e.g., a processor), non-volatile memory (e.g., flash memory), and volatile memory (e.g., RAM). In some embodiments, adapter devices 212, 214, and 216 may be coupled to server 200 using, for example, a plug-in card or soldered to the motherboard of server 200. Adapter devices 212, 214, and 216 may provide various functions, such as computing, encryption, traffic monitoring, traffic shaping, and the like. Adapter devices 212, 214, and 216 may also provide physical and virtual services to server 200 and/or virtual machines running on server 200. In some embodiments, adapter devices 212, 214, and 216 may include embedded microprocessors to allow the adapter device to execute computer executable instructions related to the implementation of management functions, or to execute other computer executable instructions related to client applications. In some embodiments, each of adapter devices 212, 214, and 216 may be implemented using a single SOC, or multiple discrete hardware elements, such as multiple cards, multiple integrated circuits, or other devices. In some embodiments, adapter devices 212, 214, and 216 may be attached externally to server 200. In some embodiments, adapter devices 212, 214, and 216 may be integrated into server 200. In some embodiments, adapter devices 212, 214, and 216 may include reconfigurable hardware resources such that they can be dynamically configured into different hardware configurations or to provide different hardware functionalities.

In some embodiments, adapter devices 212, 214, and 216 may include other components or modules, such as mass storage controllers, network controllers, display controllers, memory controllers, serial bus controllers, wireless controllers, or encryption and decryption controllers, among others. For example, adapter devices 212, 214, and 216 may include non-volatile memory that stores firmware that can be executed by a processor to cause components of adapter devices 212, 214, and 216 to initialize and identify modules of the adapter device. The non-volatile memory may include boot loader software that can be utilized to boot adapter devices 212, 214, and 216. The non-volatile memory may also include firmware that may be used to configure and boot adapter devices 212, 214, and 216 for performing different hardware functionalities based on client requests. In some embodiments, the non-volatile memory may include a flash memory.

In some implementations, each of adapter devices 212, 214, and 216 may be a PCI-based device. In these implementations, the adapter device may include a PCI interface for communicating with other components of server 200. The term "PCI" may be used to describe any protocol in the PCI family of bus protocols, including the original PCI standard, AGP, PCIe, and PCI-X. As used herein, PCI-based devices also include devices that communicate using Non-Volatile Memory Express (NVMe), which is a device interface specification for accessing non-volatile storage media attached to a computing system using PCIe. In some embodiments, various components and modules of adapter devices 212, 214, and 216 and server 200 described above may be implemented as discrete components, as a System-on-Chip (SoC), as an ASIC, as a NPU, as an FPGA, or any combination thereof. In some embodiments, each adapter device 212, 214, or 216 may be configured to provide a particular type of instance to clients.

In the illustrated example, server 200 may be configured to provide host instances, such as virtual machines or bare-metal instances. Server 200 may be a server that has been configured to run a hypervisor on underlying hardware resources, where different guest operating systems may run on the hypervisor in different virtual machines. In some cases, a customer may have installed their own hypervisor on the bare-metal instance and can use it to control its virtual machines. In the example illustrated in FIG. 2, server 200 may execute a hypervisor 240 on the underlying hardware resources, such as host processor(s) 220. One or more processes, such as virtual machines 250a, 250b, 250c, and 250d (collectively virtual machines 250), may be managed by hypervisor 240. Some or all of the virtual hardware of a virtual machine may be emulated by one or more adapter devices. In some embodiments, the adapter devices may be virtual adapter devices and may be emulated by a same card or SOC.

Virtual machines 250 running on server 200 may be managed by hypervisor 240. Hypervisor 240 may be configured to, for example, create, start, monitor, stop, and delete virtual machines 250. In some embodiments, virtual machines 250 may be assigned priorities such that the transactions initiated by one virtual machine (e.g., 250a) may take precedence over transactions initiated by another virtual machine (e.g., 250b). In some embodiments, the priorities may only take effect when the resources of server 200 or the adapter devices are heavily occupied. Priorities may, for example, take the form of service level agreements. A service level agreement may, for example, indicate an amount of resource usage permitted for a virtual machine. For example, service level agreements may indicate that a virtual machine (e.g., 250c) may only be allowed a certain amount of network bandwidth, host memory, and/or adapter device usage.

In some implementations, to support multiple virtual machines, an adapter device 212, 214, or 216 may be virtualized, such that each virtual machine may see the adapter device as if the adapter device is dedicated to the virtual machine. For example, the hardware functions of an adapter device or an SOC may include a physical function (PF) and multiple virtual functions (VFs), which may all be implemented as, for example, PCIe functions. Each PF and VF may be assigned a unique identifier (ID) for differentiating different traffic streams and applying memory and interrupt translations between the PF and VFs. The virtual functions may be assigned to virtual machines.

The physical function may be a full PCIe function that are capable of configuring and managing the functionality of VFs and the adapter device, and thus it may be possible to configure or control the adapter device using the PF. The PF may have full ability to move data in and out of the adapter device. The physical function may be responsible for allocating, resetting, and de-allocating virtual functions and the resources used by the virtual functions.

Virtual functions may be lightweight PCIe functions that may include a restricted set of resources necessary for a certain operation. A virtual function may represent a virtualized instance of the adapter device for a virtual machine. A virtual function may be associated with a particular physical function and share physical adapter resources (e.g., ports and memory) with that physical function and other virtual functions of the same adapter device. Virtual functions may operate under the respective physical functions and may not have direct access to global resources, but may access the global resources through the physical function. A virtual function may have its own PCI address space, memory space, and message space, separate from other physical or virtual functions on the same adapter device. A virtual function may either be accessed via a hypervisor or may be accessed directly by a guest operating system (without run-time intervention by the hypervisor). Guest operating systems or virtual machines may be assigned to dedicated virtual functions to perform certain operations.

Figure 3:
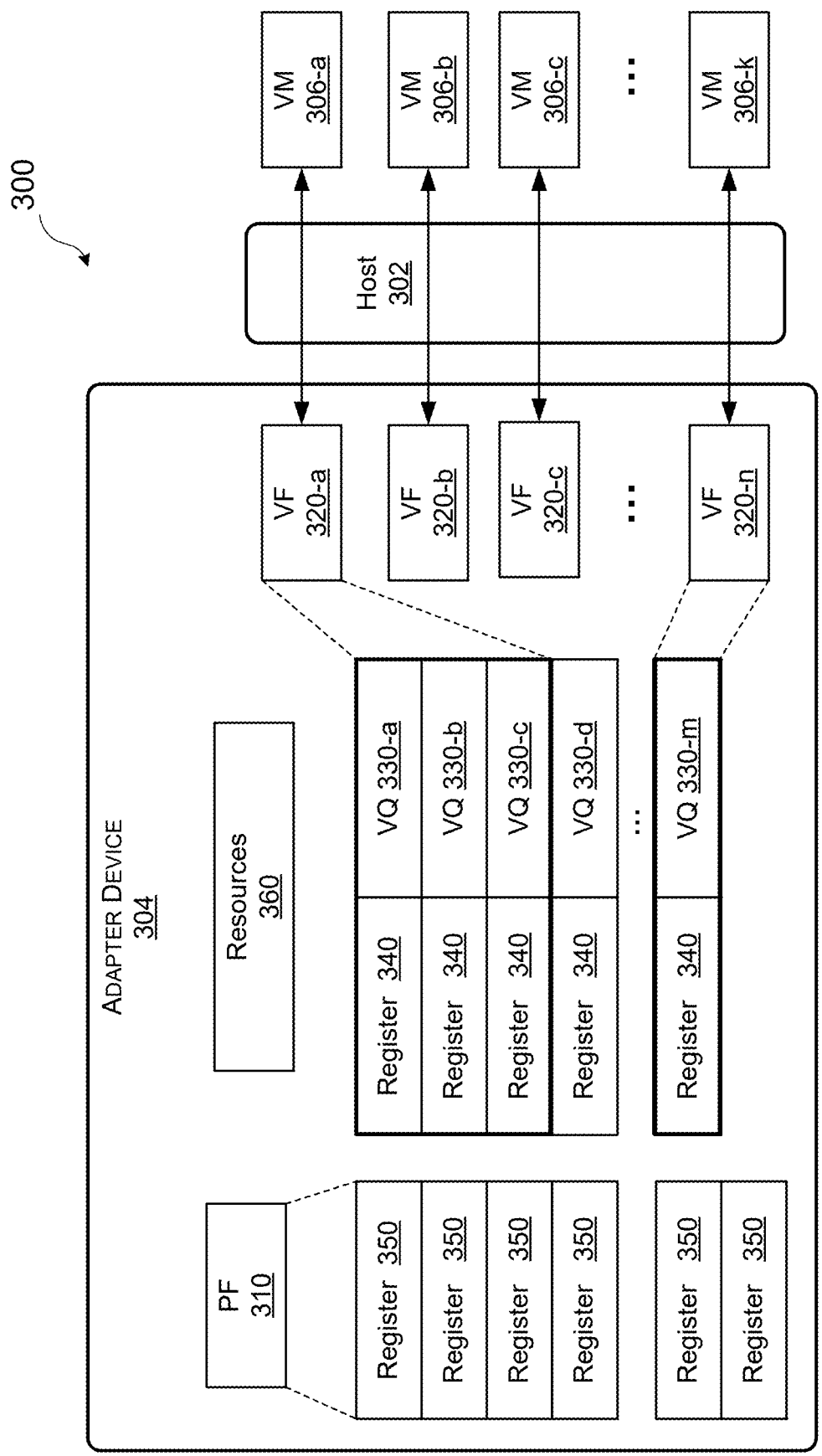
FIG. 3 illustrates an example of an adapter device of a server where the adapter device supports hardware virtualization.

FIG. 3 illustrates an example of an adapter device 304 of a server 300 where adapter device 304 may support hardware virtualization, according to certain embodiments. As illustrated, hardware functions of adapter device 304 may include a physical function 310 and a plurality of virtual functions 320-*a*, 320-*b*, 320-*c*, . . . , and 320-*n* (collectively "virtual functions 320"). Virtual functions 320 may be associated with virtual machines 306-*a*, 306-*b*, 306-*c*, . . . , and 306-*k* (collectively "virtual machines 306"). Virtual machines 306 may run on top of a host 302 of a server. Each of physical function 310 and virtual functions 320 may have a unique Layer 2 address (e.g., MAC address). Adapter device 304 may also include a plurality of virtual queues (VQs) 330-*a*, 330-*b*, 330-*c*, 330-*d*, . . . , and 330-*m* (collectively "virtual queues 330") that may be assignable resources. Virtual queues 330 may be used to store task descriptors or other information used by adapter device to perform transactions. For example, a virtual queue 330 may be a transmit queue or a receive queue that includes memory addresses of buffers for storing data to be transmitted or data received. Adapter device 304 may include other resources 360, such as memory, network interfaces, processors, and the like.

As described above, physical function 310 may assign one or more virtual queues 330 to a virtual function 320. The number of virtual queues assigned to a virtual function may depend on the size of the virtual function or the size of the virtual machine associated with the virtual function (e.g., the type of the instance or virtual machine a client purchased). In the example shown in FIG. 3, three virtual queues 330-*a*, 330-*b*, and 330-*c* may be assigned to virtual function 320-*a*, while one virtual queue 330-*m* may be assigned to virtual function 320-*n*. The virtual queues associated with a same virtual function may have the same depth. Virtual queues associated with different virtual functions may have the same or different depths. Each virtual function 320 may have its own address space (referred to as virtual function address space). The address space of each virtual function 320 may include, for each virtual queue 330 assigned to the virtual function, a virtual function memory page that may include one or more registers 340. Registers 340 may include, for example, doorbell registers, such as tail pointer registers and/or head pointer register, or other control registers. Similarly, an address space of physical function 310 (referred to as "physical function address space) may include, for each virtual queue 330, a physical function memory page that includes one or more registers 350, such as doorbell registers or other control registers.

To perform operations using adapter device 304, a virtual machine 306 may, for example, write one or more task descriptors to a descriptor queue (e.g., a descriptor ring). The task descriptors may describe the operations to be performed by the adapter device. For example, a task descriptor may identify a memory buffer that includes packet data to be transmitted by the adapter device (e.g., a network interface card). In another example, a task descriptor may identify a memory buffer for storing packet data received by the adapter device. In some embodiments, the virtual machine may try to write an updated tail point value to a doorbell register in a virtual function memory page associated with a particular virtual function 320 (or virtual queue 330 of the virtual function) that is assigned to the virtual machine. As described above, the local address space of adapter device 304 may be mapped to the system address space, and thus the doorbell register (e.g., register 340) in the virtual function memory page associated with the virtual queue 330 can be updated when the virtual machine writes to the corresponding address in the system address space. Updating register 340 or 350 may cause the adapter device to notify the associated virtual function 320. The associated virtual function 320 may then perform the transaction. For example, the virtual function 320 may copy one or more task descriptors from the descriptor ring into the virtual queue 330 and then perform the transactions described by the task descriptors.

Figure 4:
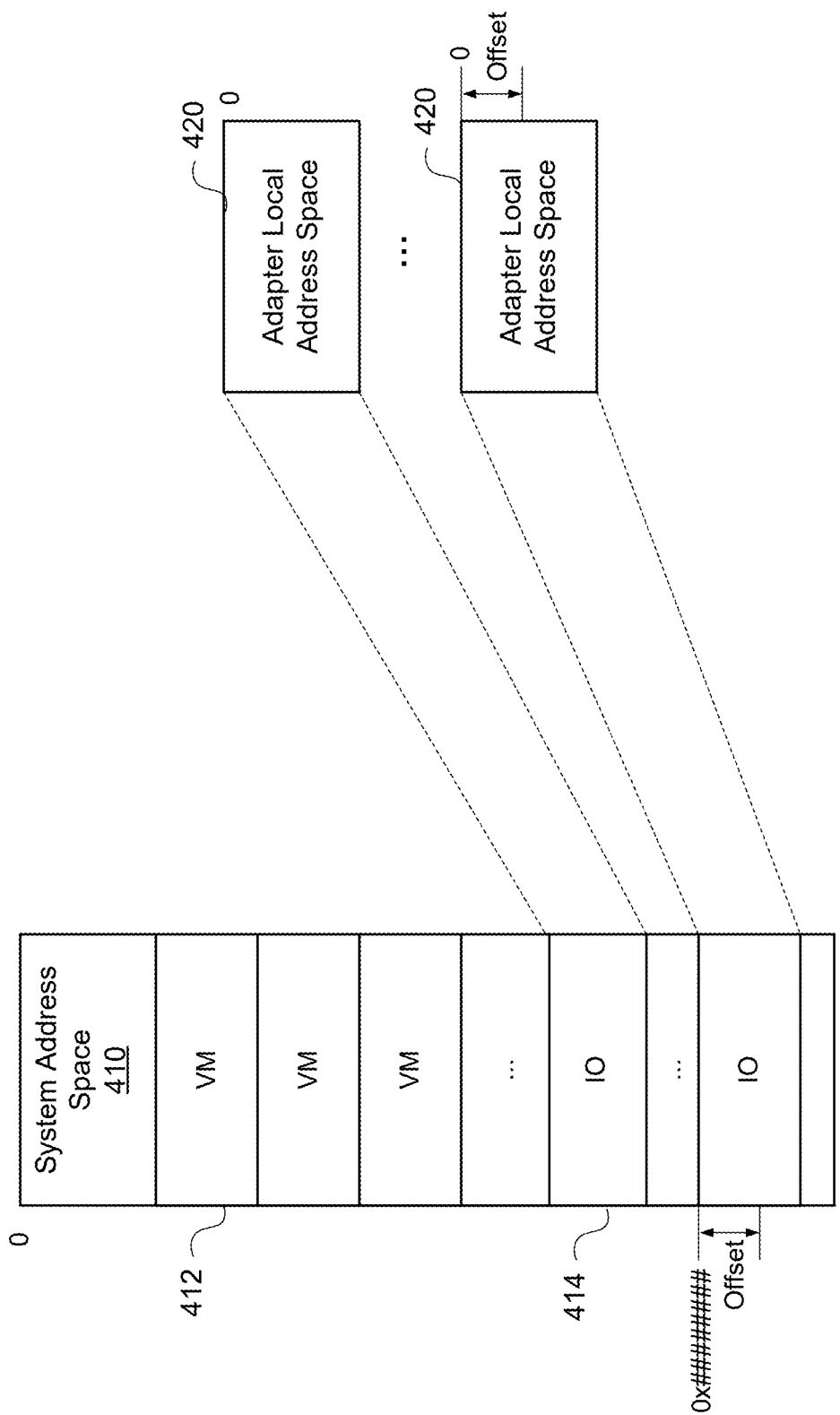
FIG. 4 illustrates an example of address space mapping between a host system address space and local address spaces of adapter devices.

FIG. 4 illustrates an example of address space mapping (e.g., address translation) between a system address space 410 and local address spaces 420 of adapter devices. System address space 410 is a global address space of a host system (e.g., a server) that a host processor (e.g., CPU) may be aware of. System address space 410 may include regions (e.g., ranges) of addresses 412 for one or more virtual machines and regions of addresses 414 mapped to local address spaces 420 of the adapter devices. As described above, the local address space 420 of an adapter device may include address ranges (or windows) for resources (e.g., including memory, such as control registers) associated with the physical function, virtual functions, and virtual queues. To access a resource (e.g., a control register) of an adapter device, a virtual machine may write to an address (or an address range) of the system address space that may be mapped to the address (or an address range) of the local address space associated with the resource of the adapter device. The address (or the address range) of the system address space may need to be translated into the address (or the address range) of the local address space that the adapter device is aware of such that the adapter device may perform transactions for the virtual machine.

According to certain embodiments, the adapter card, SOC, or another integrated circuit coupled to the adapter card or SOC may include an address decode and translate (ADT) circuit that can decode a transaction to determine, for example, the physical function, the virtual function, and the virtual queue of the virtual function for the transaction. The ADT circuit may also map the transaction address from the system address space (e.g., system address space 410) that the host is aware of to the local physical address space (e.g., local DRAM address space, such as local address space 420) of the adapter card or SOC, such that the adapter card or SOC may perform the transaction using the local physical address that the adapter card or SOC is aware of.

In addition, based on the logic and physical information determined by the transaction decoding (e.g., the physical functions, virtual functions, and/or virtual queues), the ADT circuit may make certain resolutions and decisions, such as selecting the target nodes for the transactions, associating the transactions with different ordering groups or removing dependencies between certain transactions, determining whether to track transactions associated with one or more virtual functions/virtual queues, detecting potential denial-of-service (DOS) attacks or other abnormal usage of the resources, and determining whether certain transactions needs to be cached.

Figure 5:
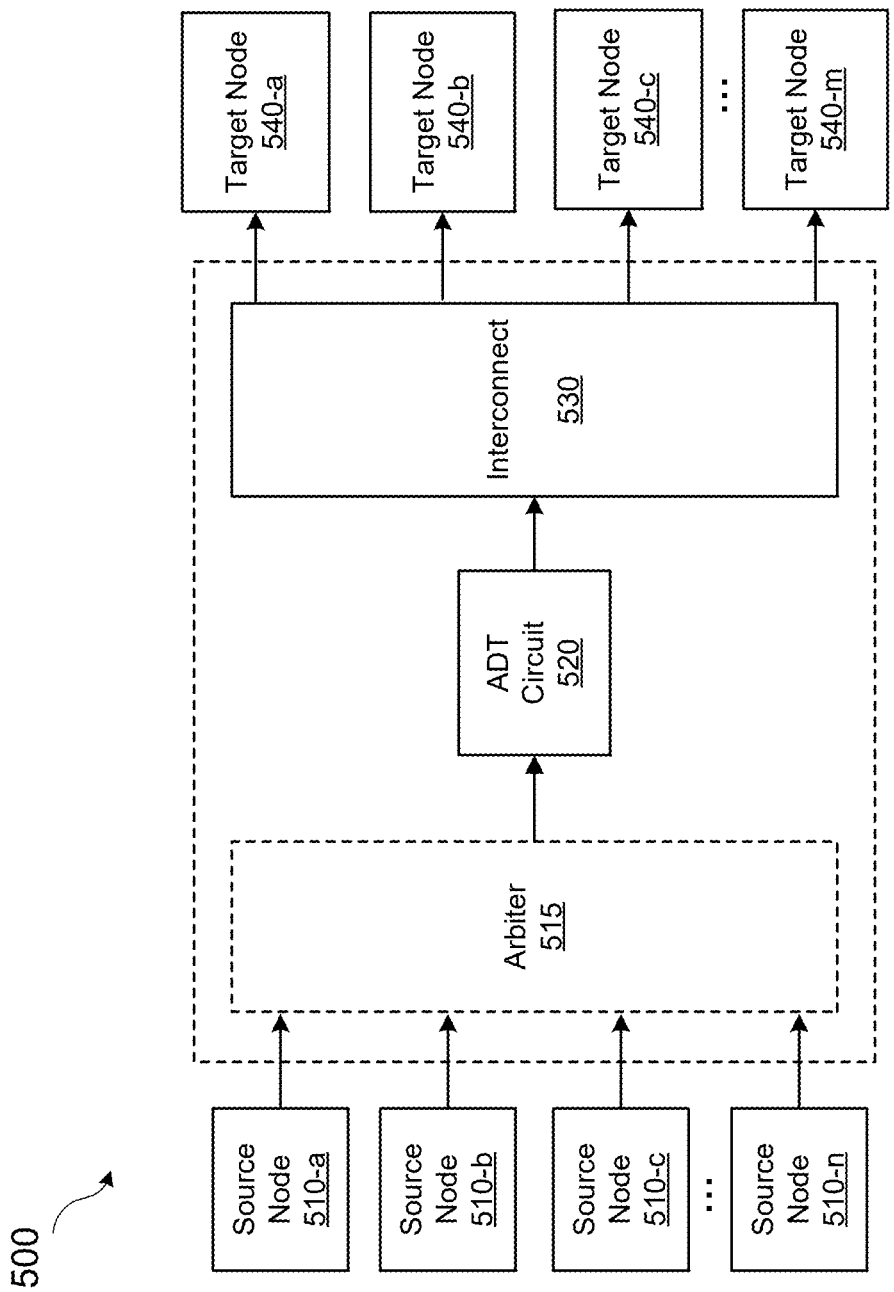
FIG. 5 includes a simplified block diagram of an example of a computing system according to certain embodiments.

FIG. 5 includes a simplified block diagram of an example of a computing system 500 according to certain embodiments. Computing system 500 may include one or more source nodes 510-*a*, 510-*b*, 510-*c*, . . . , and 510-*n* (collectively "source nodes 510"), one or more target nodes 540-*a*, 540-*b*, 540-*c*, . . . , and 540-*m* (collectively "target nodes 540"), and other resources not shown in FIG. 5, such as various types of memory (e.g., SRAMs, DRAMs, NVMs, or register files) and I/O devices. Source nodes 510 may include, for example, processing units, DMA controllers, PCIe devices, and the like. In some embodiments, a source node 510 may be a host of a server that hosts one or more virtual machines. Target nodes 540 may include, for example, local memory, coprocessors (e.g., accelerator engines, cryptographic engines, GPUs, audio processors, or a combination), DMA controllers, network controllers, I/O devices (e.g., PCIe devices, SATA devices, flash memory, UARTs, USB devices, USARTs, or a combination), or a combination thereof. In some embodiments, target nodes 540 may be adapter cards or SOCs. In some embodiments, target nodes 540 may be different functional blocks of an SOC, and may be connected using, for example, on-chip interfaces such as AXI. In some embodiments, target nodes 540 may be different devices on an adapter card. One or more applications (e.g., VMs) may run on computing system 500.

In some embodiments, each target node 540 may be associated with a respective physical function (e.g., a PCIe physical function) and one or more virtual functions (e.g., lightweight PCIe functions) managed by the physical function as described above. Each target node 540 may be allocated a respective address range that can be used to access the target node. The address range may be defined by, for example, a start address and an end address, or a start address and a window size. The respective address range for each target node 540 can be used as a decode window by an address decoder to determine if an incoming transaction is directed to the target node 540 based on a comparison of the transaction address (or an address range) of the transaction (e.g., determined by a start address and/or a size) against the decode window. If the transaction address of the transaction is within the decode window associated with the address range of a target node 540, the transaction can be directed to the target node 540.

Computing system 500 may include at least one address decode and translate (ADT) circuit 520 that may examine each incoming transaction from a source node 510, select a target node 540 and the virtual function/virtual queue for performing the transaction, generate the target node ID of the selected target node, and route the transaction to the selected target node. ADT circuit 520 may also translate the address associated with the transaction from the global address space that a host and/or a VM is aware of to the local physical address space of the SOC or the adapter device. An interconnect 530 may then direct the transaction to the selected target node based on the target node ID. Interconnect 530 may be implemented using, for example, demultiplexers, meshes, rings, crossbars, nodes, switches, bridges, or other suitable components. When computing system 500 includes two or more source nodes 510 that share a common ADT circuit 520, an arbiter 515 may be used to select incoming transactions (e.g., in the form of task descriptors) from the two or more source nodes 510, and save the incoming transactions to a descriptor queue (e.g., a descriptor ring) for decoding by ADT circuit 520. In some embodiments, computing system 500 may include two or more ADT circuits 520. For example, in some embodiments, each source node 510 may be coupled to a respective ADT circuit 520. In some embodiments, source nodes 510 may be coupled to ADT circuits 520 through arbiter 515, which may receive transactions from source nodes 510 and send the transactions to ADT circuits 520. Arbiter 515 (if used), ADT circuit 520, and interconnect 530 may be on a same SOC or on different SOCs, or may be part of an adapter card or an SOC that includes other circuits such as target nodes 540.

In one example, to request for a transaction, an application (e.g., a VM) running on computing system 500 (e.g., on or through a source node 510) may, directly or through the host, write a task descriptor to a descriptor queue or ring (e.g., directly or through arbiter 515), or write to a doorbell register or another control register. The task descriptor may describe the operation to be performed by computing system 500. For example, a task descriptor may identify a memory buffer that stores data to be transmitted, or a memory buffer for storing received data. ADT circuit 520 may, upon receiving the transaction (e.g., a task descriptor), determine the physical function associated with the transaction, the virtual function of the transaction, and the virtual queue of the transaction, in a layer-by-layer fashion, based on the transaction address associated with the transaction.

Figure 6:
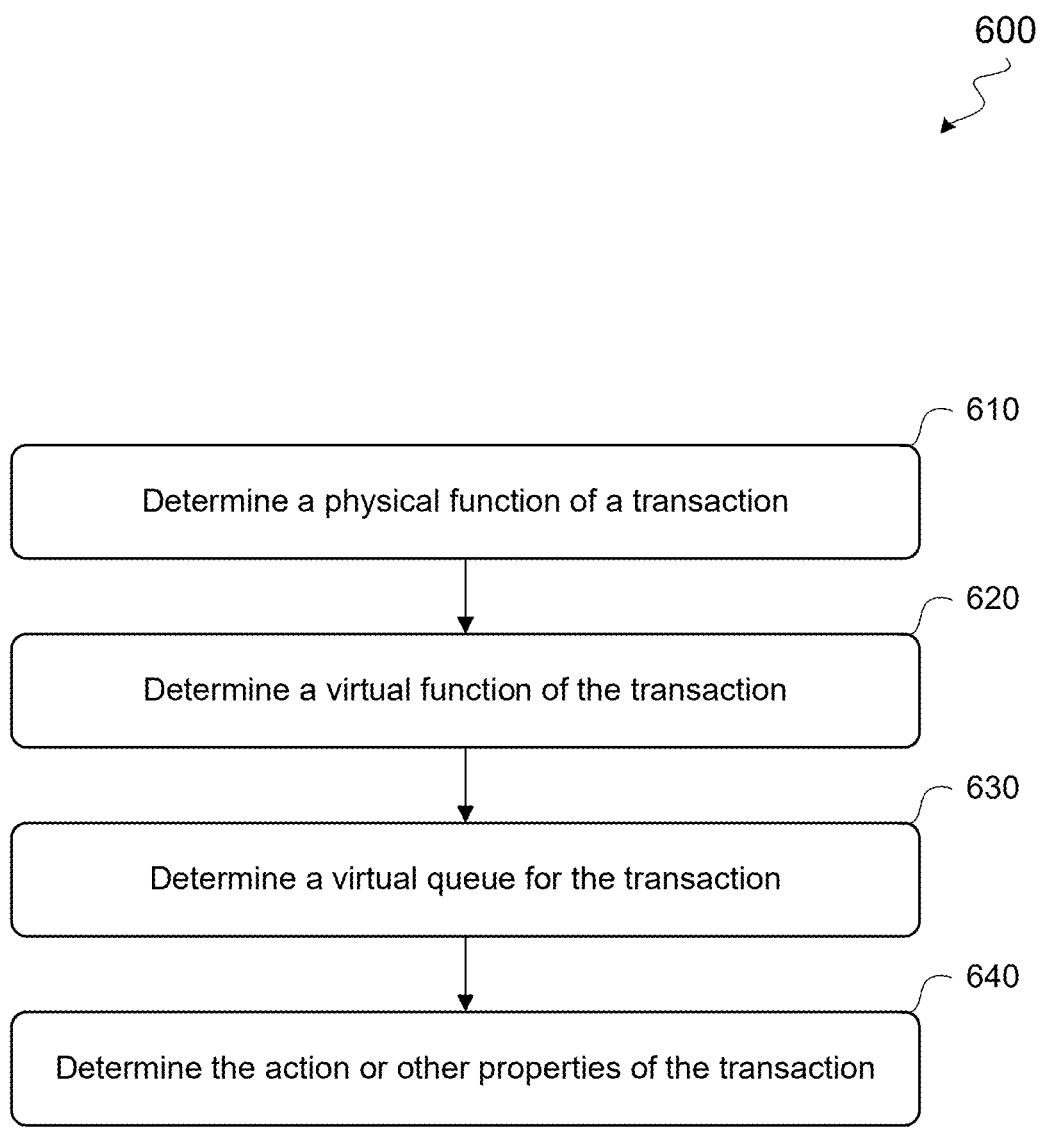
FIG. 6 includes a flowchart illustrating an example of a process of address decoding for a transaction.

FIG. 6 includes a flowchart 600 illustrating an example of a method of address decoding for a transaction. Operations described in FIG. 6 may be performed by ADT circuit 520 describe above. In some embodiments, ADT circuit 520 may decode the transaction in a layer-by-layer fashion. In some embodiments, each layer of the decoding may be performed by a functional stage of ADT circuit 520 using a table that specifies different decode windows for physical functions, virtual functions, virtual queues, or the like. The tables (e.g., physical function table, virtual function tables, and virtual queue tables) for the address decoding may be in the ADT circuit, and the content of the tables may be created or updated, for example, by local firmware of an adapter device during the virtual machine boot sequence (e.g., when a virtual function and associated virtual queues are assigned to the virtual machine).

At block 610, ADT circuit 520 (e.g., a first stage in ADT circuit 520) may first associate the transaction with a physical function (e.g., physical function of a network card, storage card, cryptographic card, or DMA card), based on the transaction address of the transaction and the address ranges (decode windows) of the physical functions associated with the target nodes, which may be specified in a table. If the address of the transaction is within the address range (e.g., decode window) of a physical function, ADT circuit 520 may select the physical function.

At block 620, ADT circuit 520 (e.g., a second stage in ADT circuit 520) may determine a virtual function of the transaction. As described above, each physical function may be associated with and may manage many virtual functions. Each virtual function may include a virtual function address space. Virtual functions associated with a physical function may have the same or different address space sizes (and numbers of virtual queues), depending on the instances (e.g., VMs) associated with the virtual function. For example, a large instance may be associated with a virtual function that has a larger virtual function address space. ADT circuit 520 may determine the virtual function associated with the transaction, for example, based on the transaction address and the address ranges (e.g., decode windows) of virtual functions associated with the physical function. The address ranges (e.g., decode windows) of the virtual functions may be specified in a virtual function table in ADT circuit 520 as described above (e.g., created during the virtual machine boot sequence by a local firmware of the adapter device), and may be used to determine the virtual function for the transaction based on the matching of the transaction address associated with the transaction and an address range (e.g., decode window) of a virtual function specified in the virtual function table.

At block 630, ADT circuit 520 (e.g., a third stage in ADT circuit 520) may determine a virtual queue within the virtual function associated with the transaction. As described above, each virtual function may include one or more virtual queues assigned to the virtual function, depending on, for example, the size of the virtual machine associated with the virtual function. Each virtual queue may be associated with a virtual function memory page. The address ranges (e.g., decode windows) of the virtual queues of a virtual function may be specified in a virtual queue table as described above. ADT circuit 520 may determine the virtual queue associated with the transaction based on, for example, the virtual queue table and the transaction address of the transaction. ADT circuit 520 may add the transaction to the determined virtual queue, and/or may update the doorbell register associated with the virtual queue for triggering the transaction.

In some embodiments, at block 640, ADT circuit 520 may determine other properties of the transaction. For example, ADT circuit 520 may determine the type of the virtual queue (e.g., descriptor queue or management queue) of the transaction. In some embodiments, ADT circuit 520 may determine certain actions associated with the transaction, such as determining the offset of the transaction address within the region of the system address space mapped to the adapter device (and thus the offset of the transaction address in the local address space of the adapter device).

As described above, the transaction address of the transaction may be an address in the host system address space that the host is aware of. To perform the transaction on a target node 540, the transaction address may need to be mapped to an address in the memory space of the adapter device that include target node 540. ADT circuit 520 may include an address translation circuit that may translate the transaction address to an address in the address space of an adapter device, for example, a DRAM address on the adapter device. For example, in some embodiments, the address translation may be performed based on the offset of the transaction address from the start address of the region of the system address space that is mapped to the adapter device or SOC, as described above with respect to, for example, FIG. 4.

Figure 7:
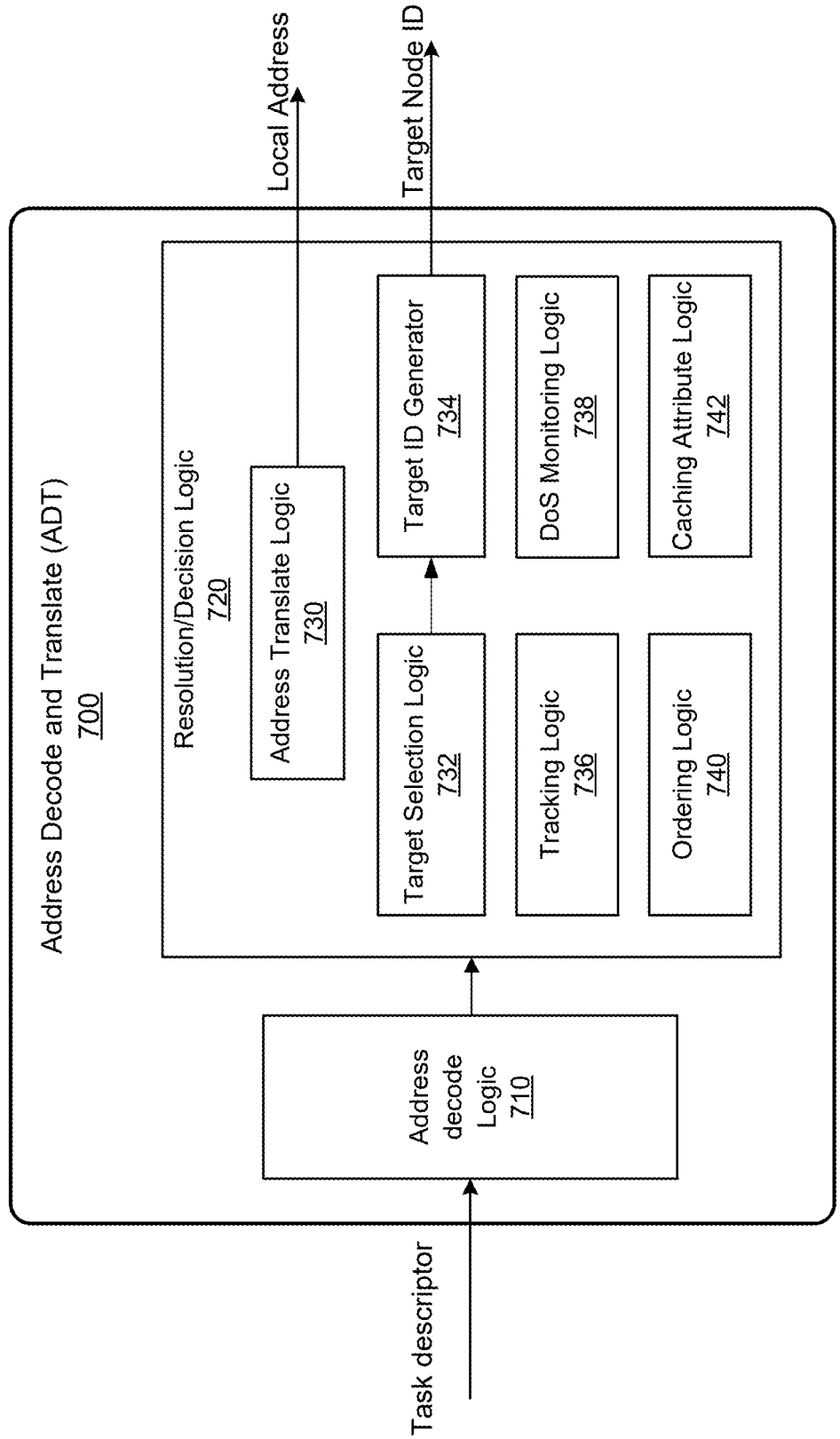
FIG. 7 includes a block diagram of an example of an address decode and translate (ADT) circuit according to certain embodiments.

FIG. 7 illustrates a block diagram of an example of an address decode and translate (ADT) circuit 700 according to certain embodiments. ADT circuit 700 may be an example of ADT circuit 520. ADT circuit 700 may include various functional blocks implemented using hardware, software, and/or firmware. These functional blocks may be referred to herein as logics. In the illustrated example, ADT circuit 700 may include an address decode logic 710 that may decode the incoming transactions to determine the physical functions, the virtual functions, the virtual queues, and other properties of the transactions, based on the transactions addresses of the incoming transactions and one or more tables that specify the decode windows, such that the transactions may be added to the appropriate virtual queues, as described above with respect to, for example, FIGS. 5 and 6.

ADT circuit 700 may also include a resolution/decision logic 720 that may use results of the address decoding by address decode logic 710 to make certain resolutions and decisions. For example, as described above, resolution/decision logic 720 may include an address translate logic 730 that may translate the transaction address in the global address space of the computing system into an address in the local address space (e.g., local DRAM address space) of the adapter device that includes the target node as described above, for example, with respect to FIGS. 4 and 6.

In some embodiments, resolution/decision logic 720 may include a target selection logic 732 that may select a target node for the transaction, such as a local memory, an accelerator, a network interface card, a storage device, a cryptographic engine, or a DMA engine. A target ID generator 734 of resolution/decision logic 720 may generate the target node ID for the selected target node, where the target node ID may be used by an interconnect (e.g., interconnect 530) to forward the transaction to the target node.

In some embodiments, resolution/decision logic 720 may include a tracking logic 736. Since the physical function, virtual function, virtual queue, and/or the address of each transaction may have been determined by address decode logic 710 and address translate logic 730, tracking logic 736 may determine, for example, whether to track transactions associated with one or more virtual functions (or virtual queues), whether multiple virtual queues would be monitored as a single entity or multiple entities, whether to monitor a specific virtual function or not, and whether different virtual functions would be monitored as a single entity or multiple entities. A virtual queue, a virtual function, a physical function, a group of virtual queues, or a group of virtual functions to be monitored as a single monitoring entity may be assigned a unique monitoring entity ID. Tracking logic 736 may track, for example, the bandwidth used, the total number of transactions, and/or the number of transactions in a certain time period for each monitoring entity ID.

For example, tracking logic 736 may determine whether a virtual function (or another monitoring entity) has exceeded the bandwidth allocated to it, and may limit the bandwidth used by the virtual function. In one example, a denial-of-service (DOS) monitoring logic 738 (which may be part of tracking logic 736 or a separate logic) may detect potential DOS attacks by a monitoring entity (e.g., a virtual function or the corresponding virtual machine) if the monitoring entity uses all or a large portion of the system bandwidth, and may then restrict the monitoring entity from using the system bandwidth. In some embodiments, tracking logic 736 may configure the bandwidth and/or the number of transactions in a given monitoring time period allocated to a monitoring entity, such that no entity may abuse the bus interface or exceed its share of bandwidth, thereby preventing potential DOS attacks.

In some embodiments, resolution/decision logic 720 may include an ordering logic 740. Ordering logic 740 may determine the dependency between transactions, group the transactions into ordering groups, and change the order and/or dependency of the transactions. For example, transactions that do not have dependency may be arranged into different groups and assigned to different queues such that they can be performed in any order, while transactions that have dependency between them may be arranged in a same ordering group (e.g., assigned to a same queue) according to the dependency such that they may be performed in the desired order. In some embodiments, descriptor transactions and other types of transactions (e.g., register transactions) may be grouped and/or reordered differently.

In some embodiments, resolution/decision logic 720 may include a caching attribute logic 742. Caching attribute logic 742 may determine whether to cache data used in a transaction. For example, caching attribute logic 742 may force a transaction to be cached or not to be cached.

Figure 8:
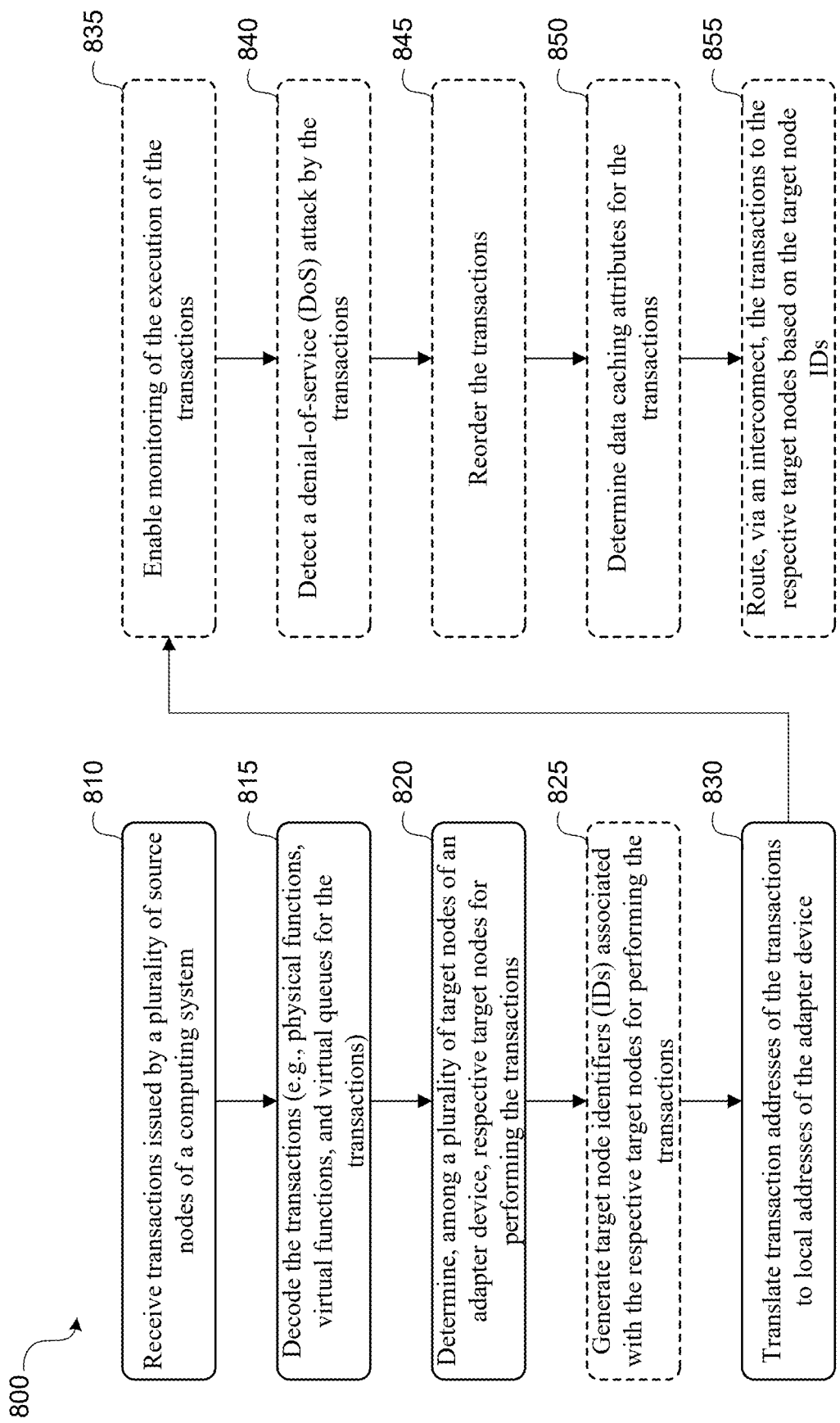
FIG. 8 illustrates an example of a process of decoding, monitoring, and managing transactions based on results of address decoding of the transactions according to certain embodiments.

FIG. 8 includes a flowchart 800 illustrating an example of a computer-implemented method according to certain embodiments. Operations described in FIG. 8 may be performed by computing system 500 or ADT circuit 700 described above. It is noted that the operations illustrated in FIG. 8 provide particular processes for decoding, monitoring, and managing incoming transactions by an ADT circuit in a multi-node computing system. Other sequences of operations can also be performed according to alternative embodiments. For example, alternative embodiments may perform the operations in a different order. Moreover, the individual operations illustrated in FIG. 8 can include multiple sub-operations that can be performed in various sequences as appropriate for the individual operations. Furthermore, some operations can be added or removed depending on the particular applications. In some implementations, two or more operations may be performed in parallel. One of ordinary skill in the art would recognize many variations, modifications, and alternatives.

At block 810, an ADT circuit (e.g., ADT circuit 700) may receive transactions issued by a plurality of source nodes of a computing system (e.g., computing system 500). As described above, the computing system may be a server or another computing system that includes one or more source nodes and a plurality of target nodes. The one or more source nodes may include, for example, processing units, DMA controllers, PCIe devices, and the like. In some embodiments, the source nodes may be different nodes of a server or another computing device (e.g., an SOC). In some embodiments, a source node may be a host of a server that may host one or more virtual machines. One or more applications (e.g., VMs) may run on the one or more source nodes of the computing system. In some embodiments, the ADT circuit may include an arbiter configured to receive the transactions issued by the plurality of source nodes and send the transactions to the decode and translation logic of the ADT circuit.

The plurality of target nodes may include, for example, local memory, coprocessors (e.g., accelerator engines, cryptographic engines, GPUs, audio processors, or a combination), DMA engines, network engines (e.g., network interface cards), I/O devices (e.g., PCIe devices, SATA devices, flash memory, UARTs, USB devices, USARTs, or a combination), or a combination thereof. In some embodiments, the plurality of target nodes may include adapter cards or SOCs. In some embodiments, the plurality of target nodes may be different functional blocks of an adapter card or an SOC, and may be connected using, for example, on-chip interfaces such as AXI. Each target node may be associated with a respective physical function (e.g., a PCIe physical function) and one or more virtual functions (e.g., lightweight PCIe functions) managed by the physical function as described above. Each target node may be allocated a respective address range that can be used to access the target node. The respective address range for each target node can be used as a decode window by an address decoder of the ADT circuit to determine if an incoming transaction is directed to the target node based on a comparison of the transaction address against the decode window. The physical function may assign one or more virtual queues to a virtual function, for example, based on the size of the virtual function or the size of the virtual machine associated with the virtual function (e.g., the type of the instance or virtual machine a client purchased). Each virtual function may have its own address space (referred to as virtual function address space). The virtual queues associated with a same virtual function may have the same depth. Virtual queues associated with different virtual functions may have the same or different depths.

At block 815, the ADT circuit may decode the transactions to determine, for example, the physical functions, the virtual functions, and the virtual queues for the transactions. As described above, the ADT circuit may include a plurality of decode window tables that is configured to store physical function address windows, virtual function address windows, and virtual queue address windows associated with the plurality of target nodes. The address decoder of the ADT circuit may be configured to decode the transactions to determine physical functions, virtual functions, and virtual queues associated with the transactions (e.g., in a layer-by-layer manner) using the plurality of decode window tables, as described above, for example, with respect to FIG. 6. Based on the results of the decoding, the ADT circuit may perform other resolution, monitoring, and management functions as described above and below.

For example, at block 820, the ADT circuit (e.g., a target selection logic of the ADT circuit, such as target selection logic 732) may determine, among a plurality of target nodes (e.g., on an adapter device or an SOC), respective target nodes for performing the transactions. For example, based on the physical function associated with a transaction, the ADT circuit may select a local memory, an accelerator, a network interface card, a storage device, a cryptographic engine, a DMA engine, or a GPU for performing the transaction. Optionally, at block 825, the ADT circuit (e.g., a target ID generator of the ADT circuit, such as target ID generator 734) may generate target node identifiers (IDs) associated with the respective target nodes for performing the transactions, where the target node IDs may be used by an interconnect (e.g., a switch or a demultiplexer, such as interconnect 530), to forward the transactions to the selected target nodes.

At block 830, the ADT circuit may translate the transaction addresses of the transactions to local addresses (e.g., in local DRAM address space) of the adapter device or SOC, as described above with respect to, for example, FIG. 4, such that the target nodes may perform the transactions based on the local addresses.

The ADT circuit may also perform one or more operations of blocks 835-850. For example, at block 835, the ADT circuit (e.g., a transaction tracking logic of the ADT circuit, such as tracking logic 736) may enable or disable monitoring of the execution of the transactions. The transaction tracking logic may determine, for example, whether to track transactions associated with a virtual function or a virtual queue, whether multiple virtual queues would be monitored as a single entity or multiple entities, whether to monitor a specific virtual function or not, and whether different virtual functions would be monitored as a single entity or multiple entities. A virtual queue, a virtual function, a physical function, a group of virtual queues, or a group of virtual functions may be monitored as a single monitoring entity, which may be assigned a unique monitoring entity ID. Tracking logic 736 may track, for example, the bandwidth used, the total number of transactions, and/or the number of transactions in a certain time period for each monitoring entity ID.

At block 840, the ADT circuit (e.g., a DoS monitoring logic of the ADT circuit, such as DoS monitoring logic 738) may detect a DOS attack by the transactions if a monitoring entity uses all or a large portion of the system bandwidth that exceeds a threshold value assigned to the monitoring entity, or if the number of transactions associated with a monitoring entity in a given monitoring time period exceeds a threshold allocated to the monitoring entity. If a DOS attack by a monitoring entity is detected, the ADT circuit may stop forwarding incoming transactions associated with the monitoring entity to the target nodes, such that no entity may abuse the bus interface or exceed its share of bandwidth or throughput.

At block 845, the ADT circuit (e.g., an ordering logic of the ADT circuit, such as ordering logic 740) may reorder the transactions. For example, the ordering logic may determine the dependency between transactions, group the transactions into ordering groups, and change the order and/or dependency of the transactions. In one example, transactions that do not have data dependency may be arranged into different groups and assigned to different queues such that they can be performed in any order, while transactions that have data dependency between them may be arranged in a same ordering group (e.g., assigned to a same queue) according to the dependency such that they may be performed in the desired order. In some embodiments, different types of transactions, such as descriptor transactions and other types of transactions (e.g., register transactions), may be grouped and/or reordered differently.

At block 850, the ADT circuit (e.g., a caching attribute logic of the ADT circuit, such as caching attribute logic 742) may enable or disable data caching for a transaction of the transactions. For example, the caching attribute logic may determine whether to cache data used in a transaction, and force a transaction to be cached or not to be cached.

At block 855, the ADT circuit may optionally route, via an interconnect (e.g., a switch or a demultiplexer, such as interconnect 530), the transactions to the respective target nodes based on the target node IDs.

Figure 9:
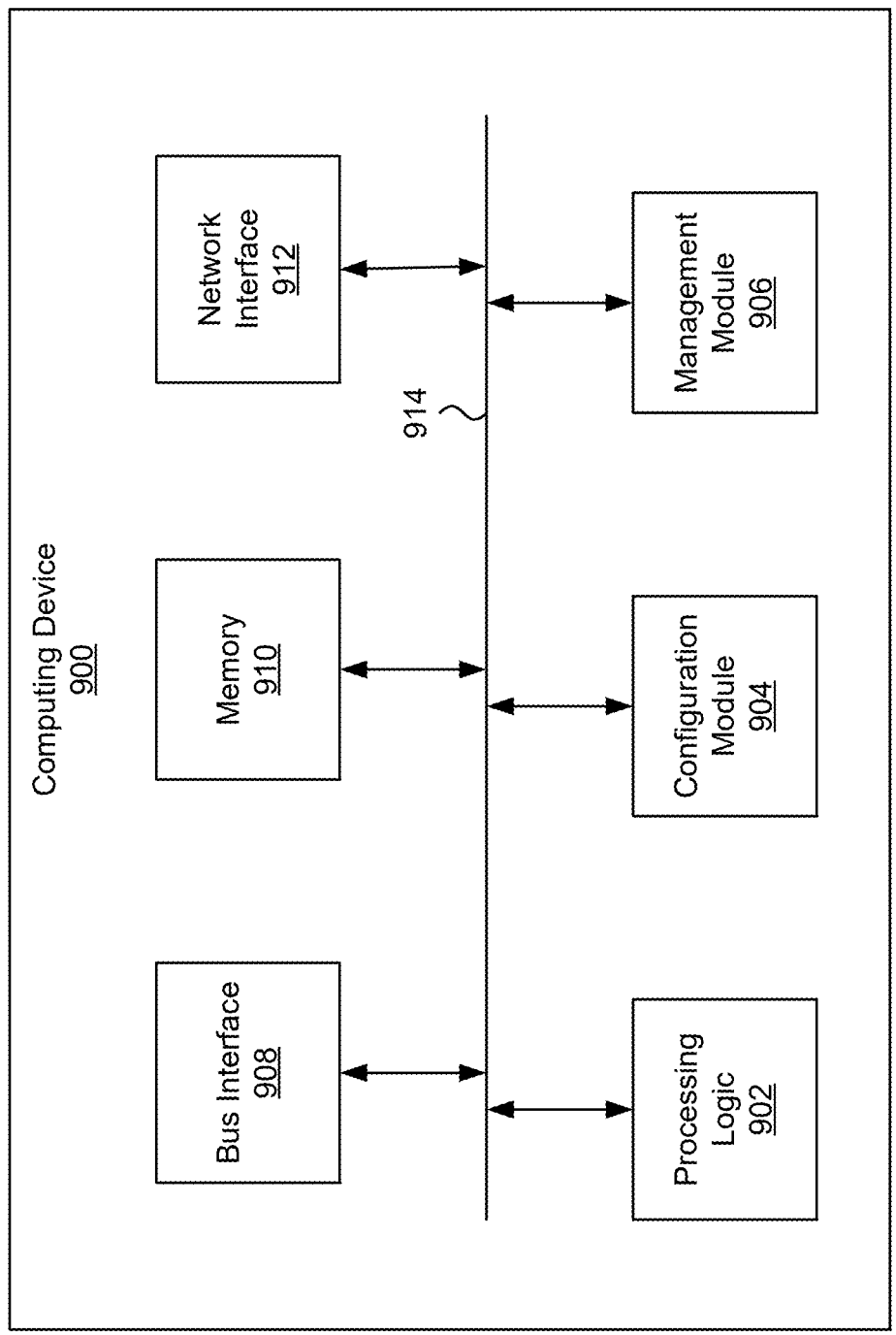
FIG. 9 illustrates an example of a computing device according to certain embodiments.

FIG. 9 illustrates an example of a computing device 900. Functionality and/or several components of the computing device 900 may be used without limitation with other embodiments disclosed elsewhere in this disclosure, without limitations. As an example, computing system 500 and ADT circuit 700 can be parts of the computing device 900. The computing device 900 may facilitate processing of packets and/or forwarding of packets from the computing device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 900 may be the recipient and/or generator of packets. In some implementations, the computing device 900 may modify the contents of the packet before forwarding the packet to another device. The computing device 900 may be a peripheral device coupled to another computer device, a switch, a router or any other suitable device enabled for receiving and forwarding packets.

In one example, the computing device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The computing device 900 may include additional modules, which are not illustrated here. In some implementations, the computing device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory.

The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the computing device 900, while in other cases some or all of the memory may be external to the computing device 900. The memory 910 may store an operating system comprising executable instructions that, when executed by the processing logic 902, provides the execution environment for executing instructions providing networking functionality for the computing device 900. The memory may also store and maintain several data structures and routing tables for facilitating the functionality of the computing device 900.

In some implementations, the configuration module 904 may include one or more configuration registers. Configuration registers may control the operations of the computing device 900. In some implementations, one or more bits in the configuration register can represent certain capabilities of the computing device 900. Configuration registers may be programmed by instructions executing in the processing logic 902, and/or by an external entity, such as a host device, an operating system executing on a host device, and/or a remote device. The configuration module 904 may further include hardware and/or software that control the operations of the computing device 900.

In some implementations, the management module 906 may be configured to manage different components of the computing device 900. In some cases, the management module 906 may configure one or more bits in one or more configuration registers at power up, to enable or disable certain capabilities of the computing device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the computing device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, InfiniBand, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 900 may include multiple network interface modules, each configured to communicate with a different network. For example, in these implementations, the computing device 900 may include a network interface module for communicating with a wired Ethernet network, a wireless 802.11 network, a cellular network, an InfiniBand network, etc.

The various components and modules of the computing device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems. as disclosed with respect to FIG. 10.

Figure 10:
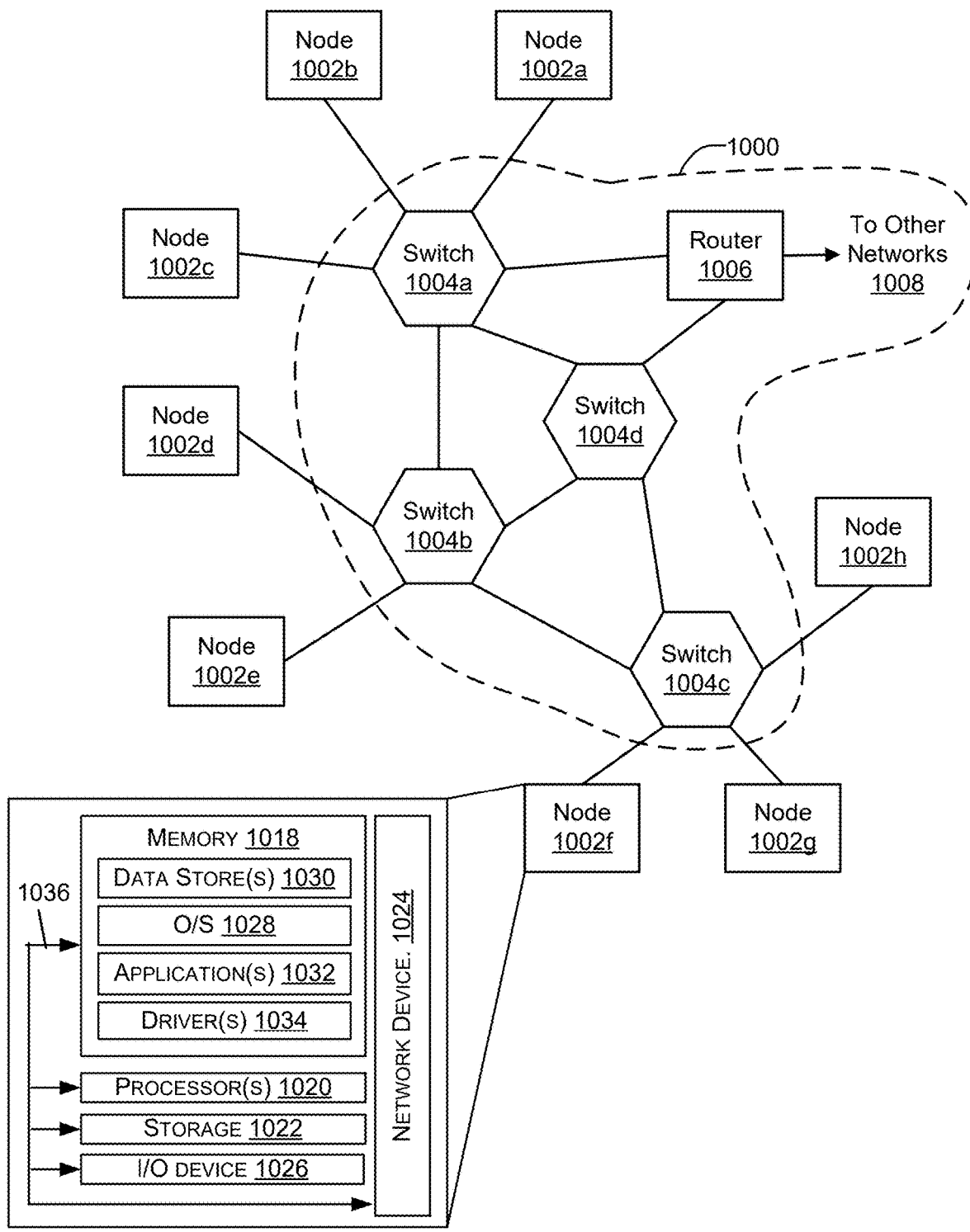
FIG. 10 illustrates various types of computing devices of a network according to certain embodiments.

FIG. 10 illustrates a network 1000, illustrating various different types of computing devices 900 of FIG. 9, such as nodes comprising network devices, switches and routers. In certain embodiments, the network 1000 may be based on a switched architecture with point-to-point links. As illustrated in FIG. 10, the network 1000 includes a plurality of switches 1004a-1004d, which may be arranged in a network. In some cases, the switches are arranged in a multi-layered network, such as a Clos network. A computing device 900 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more computing devices 900 for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more applications 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, IOS, Android, and the like. The operating system 1028 may also be a proprietary operating system.

The data stores 1030 may include permanent or transitory data used and/or operated on by the operating system 1028, applications 1032, or drivers 1034. Examples of such data include web pages, video data, audio data, images, user data, and so on. The information in the data stores 1030 may, in some implementations, be provided over the network(s) 1008 to user devices. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between applications 1032 and the operating system 1028, and/or applications 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel(s) 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000. The network device(s) 1024 of FIG. 10 may include similar components discussed with reference to the computing device 900 of FIG. 9.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 908 may implement NVMe, and the network device 1024 may be connected to a computing system using a PCIe interface.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   a plurality of source nodes configured to issue transactions each containing a transaction address;
   an address decode and translate (ADT) circuit configured to receive and decode the transactions;
   an adapter device including a plurality of target nodes configured to perform the transactions, wherein:
   each target node of the plurality of target nodes includes a physical function and a plurality of virtual functions associated with the physical function; and
   each virtual function of the plurality of virtual functions includes one or more virtual queues; and
   an interconnect coupling the ADT circuit to the plurality of target nodes,
   wherein the ADT circuit includes:
   an address decode circuit configured to determine physical functions, virtual functions, and virtual queues for the transactions, based on transaction addresses of the transactions, wherein the address decode circuit is configured to decode a transaction of the transactions by determining for the transaction:
   a physical function of the physical functions by comparing a corresponding transaction address of the transaction against a set of physical function address windows that map physical function address ranges to the physical functions; and
   a virtual function of the virtual functions by comparing the corresponding transaction address of the transaction against a set of virtual function address windows associated with the determined physical function, the set of virtual function address windows mapping virtual function address ranges to the virtual functions corresponding to the determined physical function; and
   a resolution circuit configured to, based on the physical functions, the virtual functions, and the virtual queues for the transactions, determine, among the plurality of target nodes, respective target nodes for the transactions, and perform at least one of:
   enabling or disabling monitoring of execution of the transactions;
   detecting a denial-of-service attack by the transactions;
   reordering the transactions; or
   determining data caching attributes for the transactions.

2. The system of claim 1, wherein the resolution circuit includes an address translation circuit configured to translate the transaction addresses to local addresses of the adapter device.

3. The system of claim 1, wherein:
   the ADT circuit includes a plurality of decode window tables that is configured to store the physical function address windows, the virtual function address windows, and virtual queue address windows associated with the plurality of target nodes.

4. The system of claim 1, wherein the plurality of target nodes includes a local memory, a network engine, a storage device, a cryptographic engine, a direct memory access (DMA) engine, an accelerator engine, a graphic processing unit (GPU), or a combination thereof.

5. An integrated circuit comprising:
   an address decode circuit configured to receive and decode a transaction issued by a source node of a plurality of source nodes, wherein the address decode circuit is configured to decode the transaction by:
   determining a physical function for the transaction based on a corresponding transaction address of the transaction and a set of physical function address windows that map physical function address ranges to physical functions; and
   determining a virtual function for the transaction based on the corresponding transaction address of the transaction and a set of virtual function address windows associated with the determined physical function, the set of virtual function address windows mapping virtual function address ranges to virtual functions corresponding to the determined physical function; and a resolution circuit configured to, based on a result of decoding the transaction:
  determine, among a plurality of target nodes of an adapter device, a target node for performing the transaction;
  translate a transaction address to a local address of the adapter device; and
  perform at least one of:
    enabling monitoring of execution of the transaction;
    detecting a denial-of-service (DOS) attack by the transaction;
    reordering the transaction in a sequence of transactions; or
    determining data caching attributes for the transaction.

6. The integrated circuit of claim 5, further comprising a plurality of decode window tables that is configured to store the physical function address windows, the virtual function address windows, and virtual queue address windows associated with the plurality of target nodes.

7. The integrated circuit of claim 5, wherein the resolution circuit comprises a target identifier (ID) generation circuit configured to generate a target node ID associated with the target node for performing the transaction.

8. The integrated circuit of claim 7, further comprising an interconnect configured to route the transaction to the target node based on the target node ID.

9. The integrated circuit of claim 5, wherein enabling the monitoring of the execution of the transaction includes:
  enabling monitoring of a monitoring entity that includes a virtual queue, a group of virtual queues, a virtual function, a group of virtual functions, a physical function, or a combination thereof, the monitoring including determining a bandwidth usage or a total number of transactions within a time window by the monitoring entity; and
  assigning a monitoring entity identifier to the monitoring entity.

10. The integrated circuit of claim 9, wherein detecting the DoS attack by the transaction includes detecting the DOS attack based on the bandwidth usage or the total number of transactions within the time window by the monitoring entity exceeding a threshold value.

11. The integrated circuit of claim 5, wherein reordering the transaction in the sequence of transactions includes assigning transactions that have no data dependency to different virtual queues.

12. The integrated circuit of claim 5, wherein:
  the plurality of target nodes and the integrated circuit are on a same chip, a same package, or a same board; and
  the plurality of target nodes includes a local memory, a network engine, a storage device, a cryptographic engine, a direct memory access (DMA) engine, an accelerator engine, a graphic processing unit (GPU), or a combination thereof.

13. A computer-implemented method comprising, by an address decode and translate circuit of a computing system:
  receiving a transaction issued by a source node of a plurality of source nodes of the computing system;
  decoding the transaction by:
    determining a physical function for the transaction based on a corresponding transaction address of the transaction and a set of physical function address windows that map physical function address ranges to physical functions; and
    determining a virtual function for the transaction based on the corresponding transaction address of the transaction and a set of virtual function address windows associated with the determined physical function, the set of virtual function address windows mapping virtual function address ranges to virtual functions corresponding to the determined physical function; and
  based on results of decoding the transaction:
    determining, among a plurality of target nodes of an adapter device, a target node for performing the transaction;
    translating a transaction address of the transaction to a local address of the adapter device; and
    performing at least one of:
      enabling monitoring of execution of the transaction;
      detecting a denial-of-service (DOS) attack by the transaction;
      reordering the transaction in a sequence of transactions; or
      determining data caching attributes for the transaction.

14. The computer-implemented method of claim 13, wherein decoding the transaction further comprises determining a virtual queue associated with the transaction, using the corresponding transaction address of the transaction and a set of virtual queue address windows associated with the determined virtual function.

15. The computer-implemented method of claim 13, further comprising generating a target node identifier (ID) associated with the target node for performing the transaction.

16. The computer-implemented method of claim 15, further comprising routing, via an interconnect, the transaction to the target node based on the target node ID.

17. The computer-implemented method of claim 13, wherein enabling the monitoring of the execution of the transaction includes:
  enabling monitoring of a monitoring entity that includes a virtual queue, a group of virtual queues, the virtual function, a group of virtual functions, the physical function, or a combination thereof, the monitoring including determining a bandwidth usage or a total number of transactions within a time window by the monitoring entity; and
  assigning a monitoring entity identifier to the monitoring entity.

18. The computer-implemented method of claim 17, wherein detecting the DOS attack by the transaction includes detecting the DOS attack based on the bandwidth usage or the total number of transactions within the time window by the monitoring entity exceeding a threshold value.

19. The computer-implemented method of claim 13, wherein reordering the transaction in the sequence of transactions includes assigning transactions that have no data dependency to different virtual queues.

20. The computer-implemented method of claim 13, wherein:
  the plurality of target nodes and the address decode and translate circuit are on a same chip, a same package, or a same board; and the plurality of target nodes includes a local memory, a network engine, a storage device, a cryptographic engine, a direct memory access (DMA) engine, an accelerator engine, a graphic processing unit (GPU), or a combination thereof.

* * * * *